US006253603B1

(12) United States Patent
Ross

(10) Patent No.: US 6,253,603 B1
(45) **Date of Patent: *Jul. 3, 2001**

(54) APPARATUS FOR CHECKING THE CONDITION OF DOCUMENTS

(75) Inventor: Gary A. Ross, Fife (GB)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/324,632

(22) Filed: Jun. 2, 1999

(30) Foreign Application Priority Data

Jul. 4, 1998 (GB) .................................................. 9814452

(51) Int. Cl.$^{7}$ .................................................... G01B 17/08

(52) U.S. Cl. .............................. 73/159; 73/661; 209/534; 209/590; 194/206

(58) Field of Search ............................ 73/661, 159, 570; 209/534, 590, 600; 194/206

(56) References Cited

U.S. PATENT DOCUMENTS 3,583,237 * 6/1971 Bayha ................................ 73/865.9
5,974,883 * 11/1999 Ross ...................................... 73/587

FOREIGN PATENT DOCUMENTS 658513 10/1951 (GB) .
1180088 2/1970 (GB) .
2304195 3/1997 (GB) .

* cited by examiner

*Primary Examiner*—John E. Chapman

(57) ABSTRACT

In an apparatus for checking the condition of bank notes, each note is individually transported past a brush whose bristles are in contact with one face of the note. A piezo-electric bi-morph vibration sensor is attached to the brush, the voltage output from the sensor being dependent on the amplitude of vibration of the bristles of the brush brushing against a note. The poorer the condition of a note, i.e. the rougher that its surface is, then the greater will be the amplitude of vibration of the bristles. Thus, from the voltage output of the sensor it can be determined whether a note is of an acceptably good condition.

25 Claims, 4 Drawing Sheets

APPARATUS FOR CHECKING THE CONDITION OF DOCUMENTS

BACKGROUND OF THE INVENTION

The present invention relates to an apparatus for checking the condition of documents such as bank notes.

Constant usage of paper documents such as bank notes causes them to wear. Documents need to be of a sufficiently good condition to be mechanically handled or read by automated means. Very worn, limp, torn, incomplete or folded documents can cause errors in reading them and/or cause the mechanisms handling them to jam. Known self-service deposit terminals contain such document handling mechanisms.

SUMMARY OF THE INVENTION

It is an object of the present invention to provide a simple apparatus for checking the condition of documents.

According to the present invention there is provided an apparatus for checking the condition of documents, characterized by transport means for transporting documents individually past brush means the bristles of which are arranged to make contact with at least one face of each document, vibration sensor means arranged to produce an output dependent on the vibration of said bristles brushing against a document, and condition determining means connected to said vibration sensing means and arranged to make a determination of the condition of a document contacted by said brush means on the basis of the output of said vibration sensor means.

BRIEF DESCRIPTION OF THE DRAWINGS

Two embodiments of the present invention will now be described by way of example with reference to the accompanying drawings, in which.

DETAILED DESCRIPTION

Figure 1:
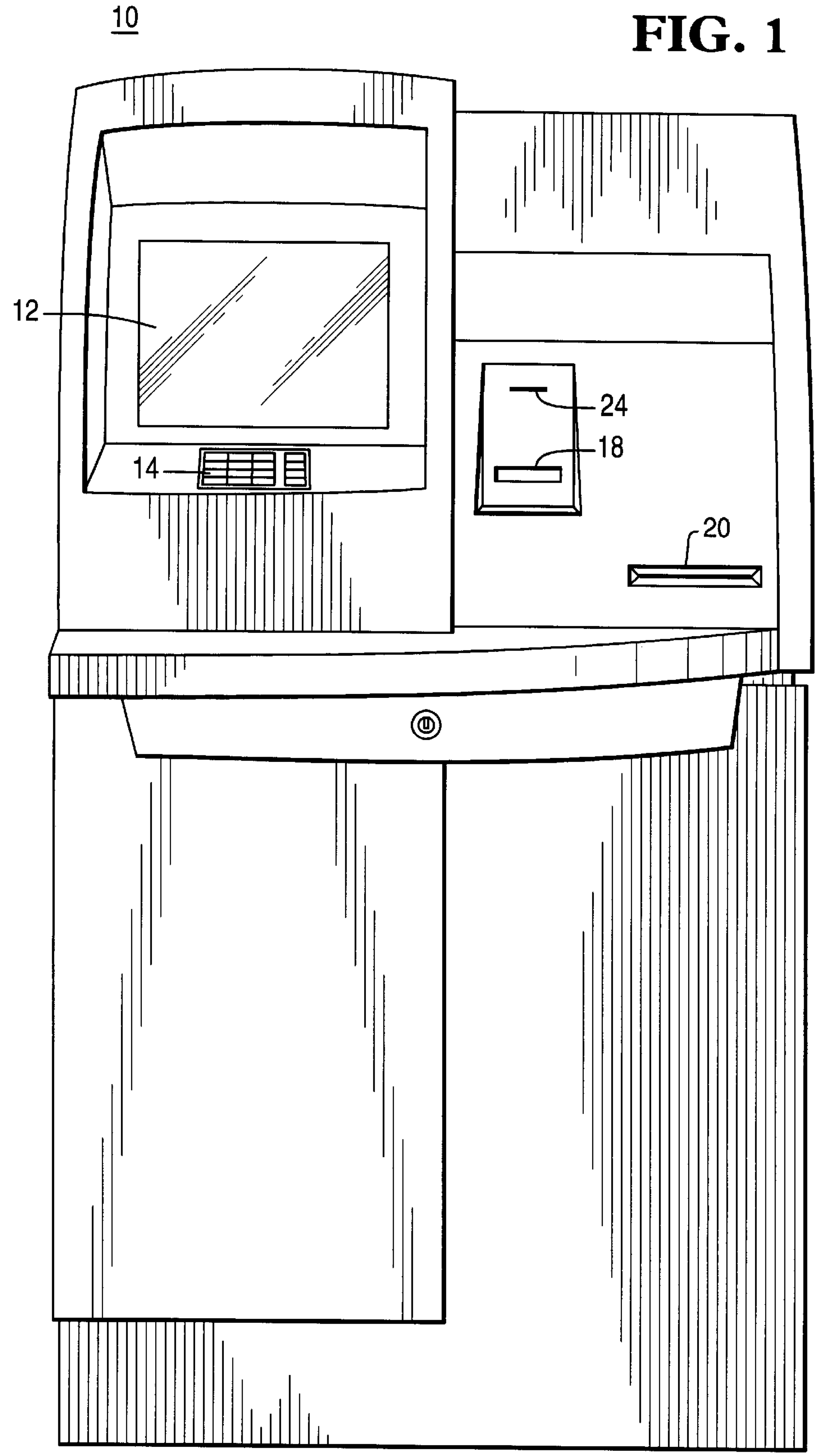
FIG. 1 is a perspective view of a self-service deposit terminal adapted to include a note checking apparatus in accordance with the invention.
Figure 2:
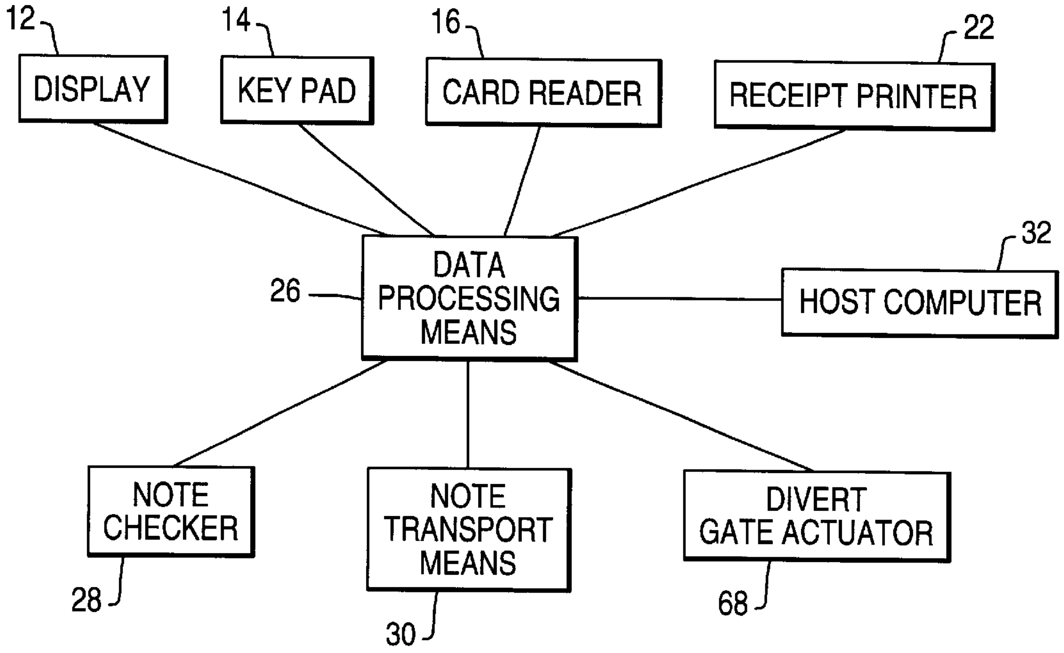
FIG. 2 is a block diagram representation of the self-service deposit terminal of FIG. 1.

Referring first to FIGS. 1 and 2, the self-service deposit terminal 10 shown therein includes a display 12 for displaying user information, a key pad 14 for inputting data, a card reader 16 for receiving a user identity card via a card slot 18, a deposit slot 20 in which bank notes can be deposited, a receipt printer 22 for printing a receipt acknowledging a deposit made by a user and for issuing the receipt to the user via a slot 24, and data processing means 26 to which the display 12, the keypad 14, the card reader 16 and the receipt printer 22 are connected. A note checker 28 (to be described in more detail later) and note transport means 30 are also connected to the data processing means 26.

To make a deposit, a user inserts his identification card in the card slot 18 of the terminal 10. Data contained in a magnetic strip on the card is read by the card reader 16 and transmitted by the data processing means 26 to a host computer 32. If the host computer 32 authorizes the card then the user can proceed with his deposit by first entering details of the transaction, e.g. the amount of the deposit, by means of the key pad 14, and then by depositing bank notes in the slot 20.

Figure 3:
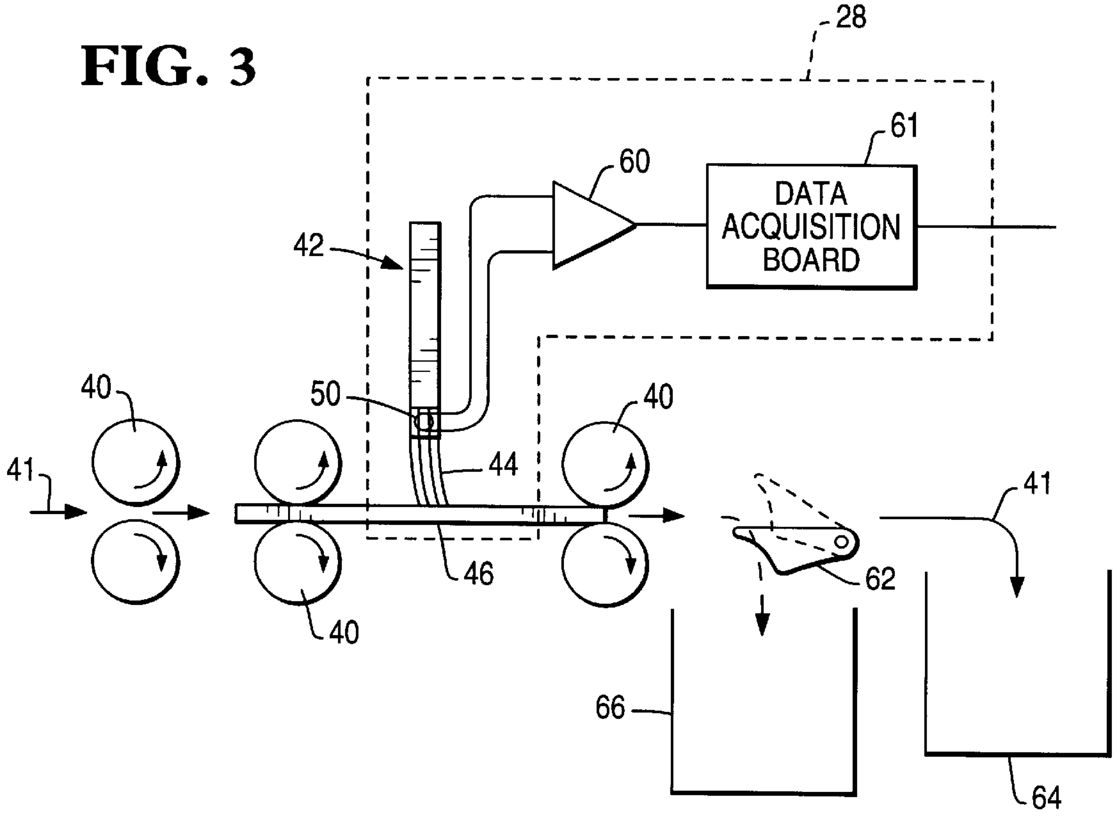
FIG. 3 is a schematic representation of a first embodiment of the note checking apparatus included in the self-service deposit terminal of FIG. 1.

Referring to FIG. 3, a first embodiment of the invention is shown. The deposited notes are separated out by conventional means (not shown). This is of a sufficiently robust construction so as not to become jammed by poor quality notes. Notes are individually transported by rollers 40 that form part of the transport means 30 along a feed path indicated by arrows 41 past the note checker 28. The note checker 28 includes a stiff hair bristle brush 42 positioned so that the bristles 44 of the brush 42 are in contact with one face of a note 46 as it passes the brush 42.

Figure 4:
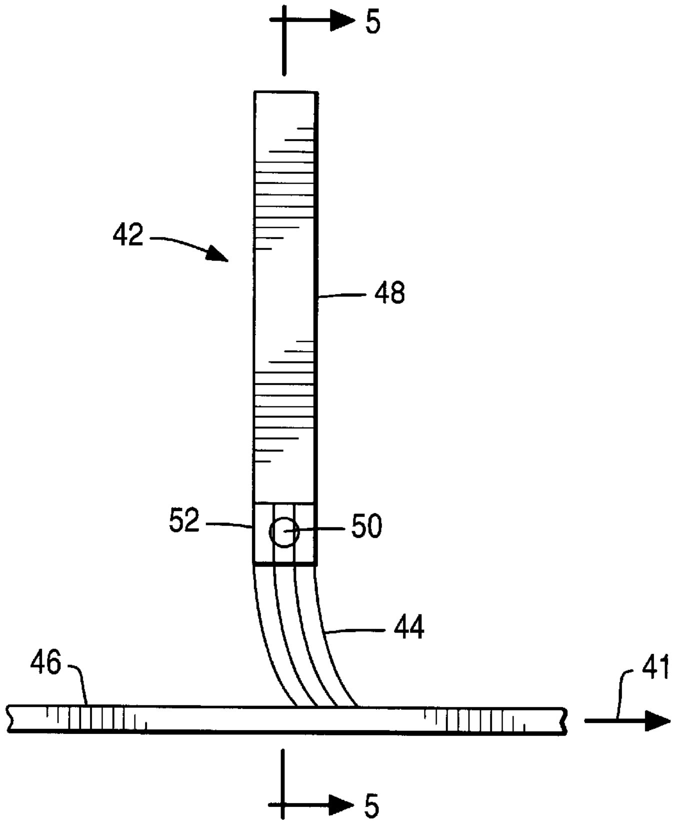
FIG. 4 is an enlarged side elevational view of a brush included in the note checking apparatus of FIG. 3.
Figure 5:
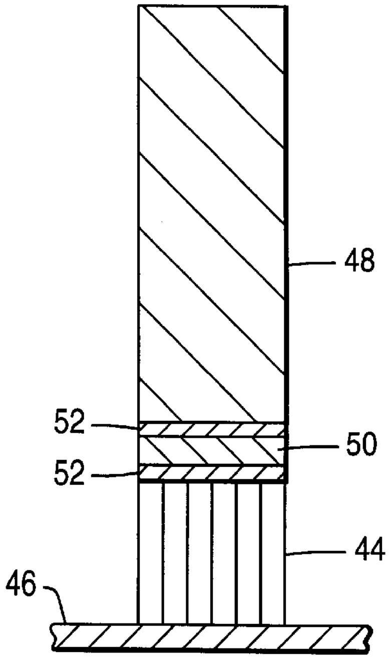
FIG. 5 is a cross-sectional view of the brush of FIG. 4 taken along the line 5—5 of FIG. 4.

Referring to FIGS. 4 and 5, the brush 42 comprises bristles 44 connected to a stem 48. Inserted into the bristles 44 just below the stem 48 is a piezoelectric bi-morph vibration sensor 50 which is embedded in, and held in place by, a non-elastic epoxy resin 52. Such a sensor 50 is available from RS Components International, of P.O. Box 99, Corby, Northants NN17 9RS, United Kingdom. When a note 46 passes, the bristles 44 of the brush 42 vibrate causing the non-elastic epoxy resin 52 and hence the sensor 50 to vibrate. The sensor 50 produces a sinusoid voltage output, the amplitude of which is proportional to the amplitude of vibration of the bristles 44 and hence is related to the condition of the note 46 with which the bristles 44 make contact. It should be understood that the poorer the condition of the note 46, i.e. the rougher that its surface is, then the greater will be the amplitude of vibration of the bristles 44.

Referring back to FIG. 3, the output of the vibration sensor 50 of the brush 42 is amplified by an operational amplifier circuit 60 of known construction and is converted from analog to digital form by a data acquisition board 61, the output of which is received by the data processing means 26. The output from the sensor 50 is sampled at a fixed rate while the note 46 is being transported past the brush 42, and a root mean square value is calculated in respect of the digital values representing the sampled output. From this root mean square value, the data processing means 26 generates a value representative of the condition of the note 46. Generation of the representative value in this way avoids any misleading results brought about by any minor inconsistencies in the note 46, such as a crease. The representative value is compared by the data processing means 26 with a stored threshold value. If this value is below the threshold value, then the note 46 is determined to be of an acceptably good condition and is transported past a divert gate 62 shown in solid outline into a collection bin 64. If, however, the representative value is not below the threshold value, then the data processing means 26 causes the note 46 to be directed into a purge bin 66. This is done by the data processing means 26 activating the divert gate 62 via an actuator 68 (see FIG. 2) into the position shown in chain outline. A message stating that a note has been rejected because of its poor condition may be displayed by the data processing means 26 on the display 12 (see FIG. 1).

In tests on new US dollars, the amplified output from the piezoelectric bi-morph vibration sensor 50 was in the range of 4.2 volts to 5.4 volts. Used notes produced amplified signals in the range of 7.3 volts to 12.4 volts and rag notes produced amplified signals of about 15 volts. Rag notes are notes of such a condition that banks would reject and destroy them.

Figure 6:
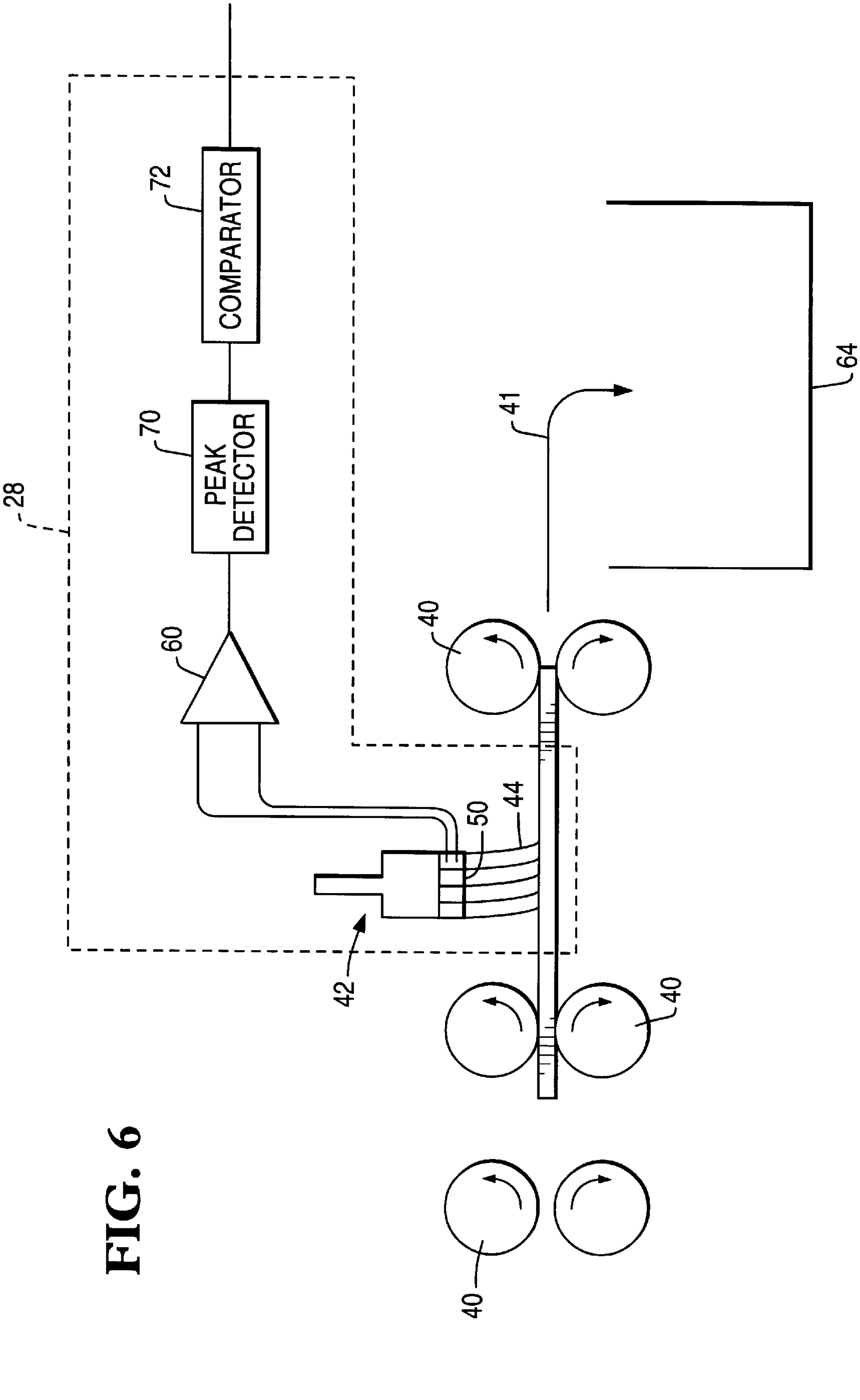
FIG. 6 is a schematic representation of a second embodiment of the note checking apparatus.

Referring to FIG. 6, a second embodiment for a simpler arrangement is shown where notes are individually deposited in the deposit slot 20 instead of being deposited as a stack of notes in the deposit slot 20. The signal of the vibration sensor 50 of the brush 42, amplified by the operation amplifier circuit 60, is applied to a peak detector 70 and the peak voltage is compared with a threshold voltage held in a comparator 72. If the peak voltage is below the threshold voltage then the output of the comparator 72 causes the data processing means 26 to keep the rollers 40 rotating in the same direction so that the note 46 is transported into the collection bin 64. If the peak voltage is not below the threshold voltage, then the rollers 40 are reversed in direction and the note is returned to the user via the deposit slot 20. The divert gate 62 and its actuator 68 (see FIG. 2) are not required in this embodiment.

For both embodiments, although only one threshold value would be required for all denominations of a particular currency, the threshold value may need to be changed for other currencies.

Although the embodiments shown are for a self-service deposit terminal the apparatus could be used for any machine that handles bank notes such as vending machines.

It will be appreciated that each of the condition checking apparatuses described are of simple construction and cheap to manufacture.

What is claimed is:

1. An apparatus for checking condition of documents, the apparatus comprising:

brush means including bristles for making contact with at least one face of each document;

transport means for transporting documents individually past the brush means;

vibration sensor means for producing an output dependent on the vibration of the bristles brought about by their brushing against a document; and condition determining means connected to the vibration sensing means and for making a determination of the condition of a document contacted by the bristles of the brush means on the basis of the output of the vibration sensor means.

2. An apparatus according to claim 1, wherein the vibration sensor means is attached to the bristles by a non-elastic epoxy resin.

3. An apparatus according to claim 1, wherein the vibration sensor means includes at least one piezoelectric bi-morph vibration sensor.

4. An apparatus according to claim 1, further comprising (i) a reject container, and (ii) a divert mechanism for diverting documents which have been determined not to be in an acceptably good condition into the reject container.

5. An apparatus according claim 1, wherein the condition determining means includes a data processor.

6. An apparatus according to claim 5, wherein (i) the output from the vibration sensor means is periodically sampled while the bristles are brushing against a document, and (ii) the data processing means calculates a root mean square value of the sampled output so as to generate a value representative of condition of a document.

7. An apparatus according to claim 6, wherein the data processing means compares the value representative of condition of a document with a stored threshold value to determine whether the document is of an acceptably good condition.

8. An apparatus according to claim 1, wherein the condition determining means includes (i) a peak detector for detecting the maximum output from the vibration sensor means for a document, and a (ii) comparator for comparing the maximum output with a stored threshold value to determine whether the document is of an acceptably good condition.

9. A self-service terminal which handles bank notes, the self-service terminal comprising:

a brush including bristles for contacting a bank note;

a transport mechanism for transporting a bank note past the brush;

a vibration sensor for producing an output which depends upon vibration of the bristles as the bristles contact a bank note which is being transported past the brush; and a processing unit for determining condition of a bank note contacted by the bristles of the brush based upon the output of the vibration sensor.

10. A self-service terminal according to claim 9, wherein the vibration sensor is attached to the bristles by a non-elastic epoxy resin.

11. A self-service terminal according to claim 9, wherein the vibration sensor includes at least one piezoelectric bi-morph vibration sensor.

12. A self-service terminal according to claim 9, further comprising (i) a reject container, and (ii) a divert mechanism for diverting bank notes which have been determined not to be in an acceptably good condition into the reject container.

13. An apparatus according to claim 9, wherein (i) the output from the vibration sensor is periodically sampled while the bristles are brushing against a bank note, and (ii) the processing unit calculates a root mean square value of the sampled output so as to generate a value representative of condition of a bank note.

14. A self-service terminal according to claim 13, wherein the processing unit compares the value representative of condition of a bank note with a stored threshold value to determine whether the bank note is of an acceptably good condition.

15. A self-service terminal according to claim 9, wherein the processing unit includes (i) a peak detector for detecting the maximum output from the vibration sensor for a bank note, and a (ii) comparator for comparing the maximum output with a stored threshold value to determine whether the bank note is of an acceptably good condition.

16. A method of checking condition of a document, the method comprising the steps of:

(a) producing an output which depends upon vibration of bristles brought about by their brushing against a document; and (b) determining condition of a document based upon the output.

17. A method according to claim 16, further comprising the step of:

(c) diverting documents which have been determined not to be in an acceptably good condition into a reject container.

18. A method according to claim 16, wherein step (b) includes the step of:

(b-1) calculating a root mean square value to generate a value representative of condition of a document.

19. A method according to claim 18, wherein step (b-1) includes the step of:

(b-1-1) comparing the value representative of condition of a document with a stored threshold value to determine whether the document is of an acceptably good condition.

20. A method according to claim 16, wherein step (b) includes the step of:

(b-1) detecting a maximum output from step (a), and (ii) comparing the maximum output with a stored threshold value to determine whether the document is of an acceptably good condition.

21. A method of checking condition of a bank note, the method comprising the steps of:

(a) producing an output which depends upon vibration of bristles brought about by their brushing against a bank note; and (b) determining condition of a bank note based upon the output.

22. A method according to claim 21, further comprising the step of:

(c) diverting bank notes which have been determined not to be in an acceptably good condition into a reject container.

23. A method according to claim 21, wherein step (b) includes the step of:

(b-1) calculating a root mean square value to generate a value representative of condition of a bank note.

24. A method according to claim 23, wherein step (b-1) includes the step of:

(b-1-1) comparing the value representative of condition of a bank note with a stored threshold value to determine whether the bank note is of an acceptably good condition.

25. A method according to claim 21, wherein step (b) includes the step of:

(b-1) detecting a maximum output from step (a), and (ii) comparing the maximum output with a stored threshold value to determine whether the bank note is of an acceptably good condition.

* * * * *